United States Patent [19]

Ervin et al.

[11] 4,323,762
[45] Apr. 6, 1982

[54] ENERGY-TEMPERATURE OCCUPANT MONITOR APPARATUS

[76] Inventors: Ron E. Ervin, P.O. Box 117, Mt. Pleasant, Mich. 48858; Noble Belcher, 806 N. Webster, Saginaw, Mich. 48602

[21] Appl. No.: 147,477

[22] Filed: May 7, 1980

[51] Int. Cl.³ ............................................... H05B 1/02
[52] U.S. Cl. ................................... 219/482; 219/508; 219/490; 219/494; 165/11 R; 200/44; 200/42 R; 307/142
[58] Field of Search ............... 219/482, 485, 490, 492, 219/507, 508; 200/42 R, 51 R, 44; 307/112, 142; 340/417; 165/11 R

[56] References Cited

U.S. PATENT DOCUMENTS

| | | | |
|---|---|---|---|
| 2,674,701 | 4/1954 | Maseritz | 307/112 |
| 2,777,023 | 1/1957 | Sepulveda | 200/51 R |
| 2,835,830 | 5/1958 | Rathenau | 307/112 |
| 2,846,530 | 8/1958 | Wintriss | 200/51 R |
| 3,246,178 | 4/1966 | Comstock, Jr. et al. | 307/142 X |
| 3,514,557 | 5/1970 | Jette, Jr. | 307/112 X |
| 3,524,029 | 8/1970 | Laff | 200/44 |
| 3,903,395 | 9/1975 | Hamstra | 219/497 |
| 3,974,348 | 8/1976 | Lipschutz | 200/44 |
| 4,060,123 | 11/1977 | Hoffman et al. | 165/11 |
| 4,063,110 | 12/1977 | Glick | 307/112 |
| 4,107,484 | 8/1978 | Petersen | 200/44 |
| 4,167,658 | 9/1979 | Sherman | 200/51 R |
| 4,225,777 | 9/1980 | Schindler | 219/497 |

Primary Examiner—B. A. Reynolds
Assistant Examiner—M. Paschall
Attorney, Agent, or Firm—Basile, Weintraub & Hanlon

[57] ABSTRACT

Apparatus for disconnecting electrical powered devices from a source of electrical energy when the use of the devices is no longer needed. The apparatus includes an electrical switch movable in response to an actuation member. The switch is connected between a source of electrical energy and an electrical powered device so as to selectively connect/disconnect the device to the source of electrical energy depending upon the use of the actuation member. A second electrical switch, also responsive to the actuation member, is connected between the source of electrical energy and another electrical powered device, such as a heating/air conditioning unit, to connect/disconnect the heating/air conditioning unit to the source of electrical energy. One temperature responsive device is associated with the second electrical switch in order to maintain the room temperature above a predetermined minimum temperature. Additional temperature responsive devices are provided to automatically maintain the room temperature within preset limits.

6 Claims, 3 Drawing Figures

ENERGY-TEMPERATURE OCCUPANT MONITOR APPARATUS

BACKGROUND OF THE INVENTION

1. Field of the Invention

This invention relates, in general, to electrical control devices and, more specifically, to electrical control devices which selectively connect electrical powered devices to a source of electrical energy.

2. Description of the Prior Art

A major concern in the world today is our dwindling energy supplies. Numerous attempts have been made to conserve energy by eliminating unnecessary usage of energy. Such attempts have included the use of timers to turn electrical powered devices, such as lights, appliances, etc., on and off at predetermined times in order to eliminate the usage of such devices when they are not needed.

Energy conservation devices also have been applied to heating systems which incorporate timers to automatically raise or lower the house or building temperature at preset times during the day or night.

Special problems exist with hotels and motels wherein each individual room has its own controllable electrical devices, such as television, radio and lights, as well as an individual heating/air conditioning control unit. Such devices are commonly left on by occupant when the occupant leaves the room which needlessly wastes electrical energy.

Thus, it would be desirable to provide a control apparatus which ensures that the power to electrical devices located in a certain area is turned off whenever the area is unoccupied. It would also be desirable to provide a control apparatus which is operable when the occupant leaves the room in which the electrical powered devices are located. Finally, it would be desirable to provide a control apparatus which is fail-safe and enables the use of the electrical devices in the event of a failure of the control apparatus.

SUMMARY OF THE INVENTION

There is disclosed herein a unique energy-temperature occupant monitor apparatus for disconnecting electrical devices from a source of electrical energy when the use of the devices is no longer needed. The apparatus includes an electrical switch which is switchable in response to an actuation means to connect or disconnect the device to the electrical energy source. The actuation means is secured to and carried by means for controlling access to the predetermined area or room in which the electrical devices are located. In addition, the actuating means is lockably secured to the electrical switch when the electrical switch is moved to the second or on position thereby preventing the removal of the actuating means unless the electrical switch is returned to the first or off position. In this manner, the electrical devices must be disconnected from the source of electrical energy before the means for controlling access to the predetermined area can be removed from the area.

A second electrical switch, also responsive to the actuating means, is connected between the source of electrical energy and another electrical power device, such as a heating/air conditioning unit, in order to selectively connect/disconnect the heating/air conditioning unit to the electrical energy source. Means for automatically maintaining the temperature of the predetermined area above a preset minimum temperature is also provided. The temperature compensating means includes a temperature responsive device which is associated with the second electrical switch in order to energize the heating unit whenever the temperature falls below the preset minimum temperature. Additional temperature responsive devices are provided in order to automatically maintain the temperature of the predetermined area within preset limits.

The energy-temperature monitor apparatus of this invention uniquely insures that the power to electrical devices, such as a television and a heating/air conditioning unit, is disconnected whenever the occupant of a predetermined area or room leaves the room. This apparatus is ideally suited for use in hotel and motel rooms in which each room has its own controllable electrical devices and individual heating/air conditioning unit.

The actuating means preferably comprises a key which is insertable into a rotatable lock mounted in an enclosure located within the room. The key is inserted within the lock and rotated to the on position in order to connect electrical power to the electrical devices, such as the television and the heating/air conditioning unit. Furthermore, the key is securely connected to the room key and is lockably maintained within the lock when the key is rotated to the on position such that the room key cannot be removed by the occupant from the room unless the power to the electrical control devices has been disconnected. This ensures that the devices are turned off whenever the occupant leaves the room and thereby results in substantial energy savings.

The energy-temperature monitor apparatus further includes automatic temperature compensating means for maintaining the temperature of the room above a preset minimum. This provides an adequate comfort level upon first entering a room and still results in energy savings since the temperature of the room can be maintained below that normally required for human comfort.

Additional temperature compensating means are also provided to maintain the temperature within preset limits. This enables the temperature of the room to be maintained within Federal guidelines and prevents the occupant from attempting to maintain excessive temperatures within the room.

The control circuitry utilized in the energy-temperature monitor apparatus of this invention is designed so as to be "fail-safe". In this manner, in the unlikely event of a control failure within the apparatus, the electrical powered devices, such as the television and heating/air conditioning unit, will still be connected to a source of electrical power thereby enabling their continued use.

BRIEF DESCRIPTION OF THE DRAWING

The various features, advantages and other uses of this invention will become more apparent by referring to the following detailed description and drawing in which.

DESCRIPTION OF THE PREFERRED EMBODIMENTS

Figure 1:
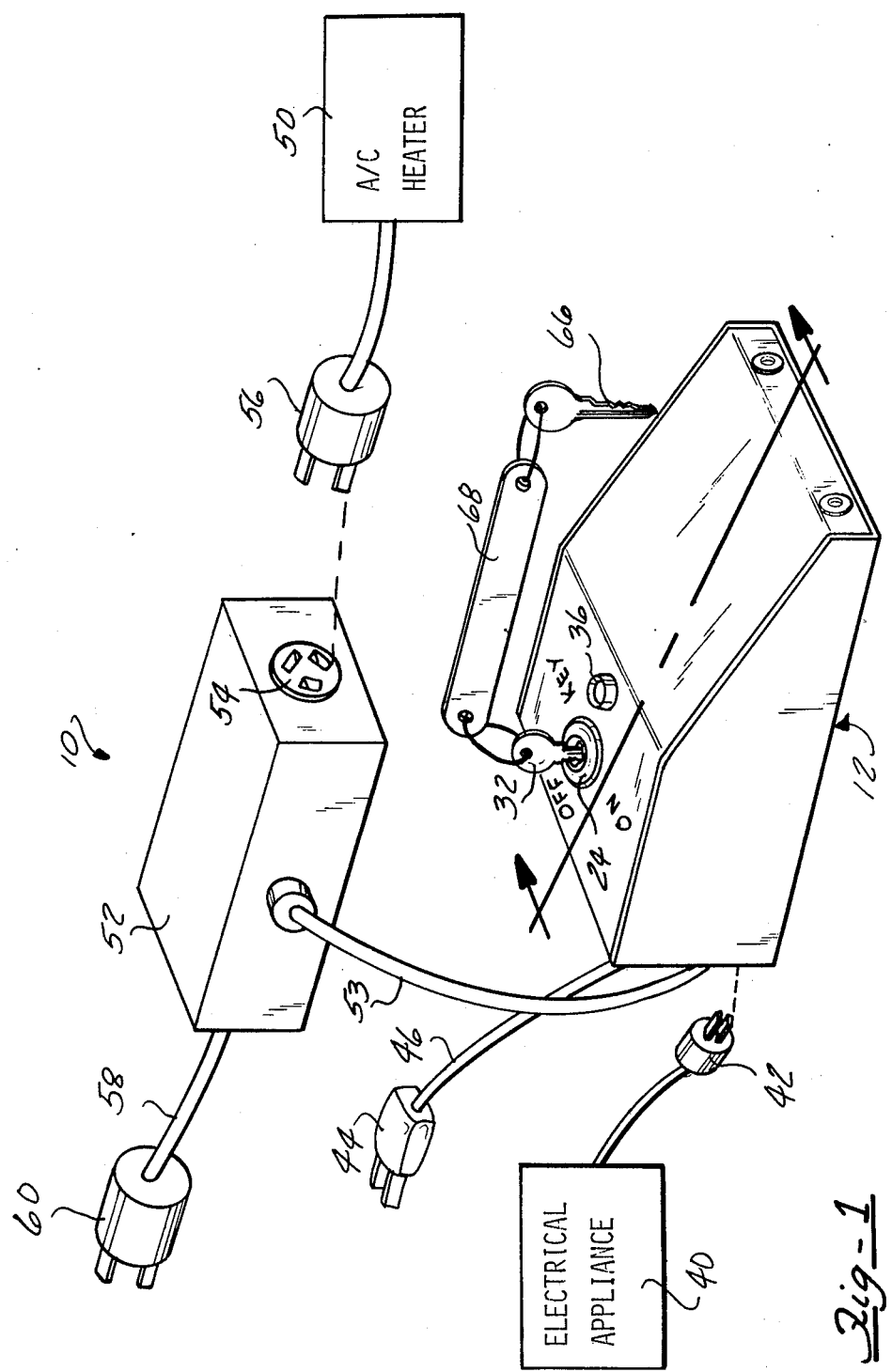
FIG. 1 is a perspective view of the energy-temperature occupant monitor apparatus of this invention.

Throughout the following description and drawing, identical reference numbers are used to refer to the same component shown in multiple figures of the drawing.

Figure 2:
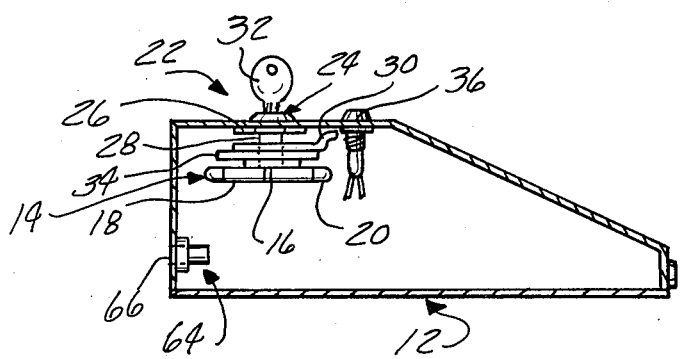
FIG. 2 is a cross sectional view, generally taken along line 2—2 in FIG. 1, and showing the components mounted in the control enclosure.

Turning now to the drawing, and to FIGS. 1 and 2 in particular, there is shown an energy-temperature occupant monitor apparatus 10 adapted to connect/disconnect electrical power devices within a prescribed area to a source of electrical power. The energy monitor apparatus 10 is ideally suited for use in hotel and motel rooms which include individually controlled electrical appliances, such as televisions and radios, and individual controls for heating and cooling.

Although the monitor apparatus 10 will be described as controlling one electrical device and one heating/air conditioning unit, it will be understood that additional contacts and relays may be added to control additional electrical powered devices.

The monitor apparatus 10 includes a control enclosure 12 in the form of a hollow housing. The control enclosure 12 is located within the predetermined area or room having the electrical powered devices that are to be controlled. The control apparatus 12 may be disposed on any convenient surface or it may be permanently mounted within the room.

An electrical switch means 14 is mounted within the enclosure 12 and is switchable between a first off position. According to the preferred embodiment of this invention, the electrical means 14 comprises a mercury switch 16 having first and second poles 18 and 20, respectively. The first and second poles 18 and 20 are positioned such that the first pole 18 is closed when the switch means 14 is disposed in the off position and the second pole 20 is closed when the electrical switch means 14 is switched or moved to the on position. Although a mercury type switch is illustrated and described as forming the electrical switch means 14 of this invention, it will be understood that other types of electrical switches may also be used to practice this invention.

The monitor apparatus 10 further includes removable actuating means for switching the electrical switch means 14 between first and second positions. The actuating means is denoted generally by reference number 22 in FIG. 2. According to the preferred embodiment of this invention, the actuating means 22 comprises a conventional key operated lock 24 which is mounted to the top surface of the enclosure 12 by means of a threaded nut 26. The lock 24 includes a rotatable lock cylinder 28 having a tongue member 30 secured thereto so as to be rotatable with the lock cylinder 28. The lock assembly 24 also includes an integrally formed keyed slot adapted to receive a key 32. The key 32 is suitably formed so as, upon insertion in the slot, to rotate the lock cylinder 28 of the lock assembly 24 betweeen first and second or on and off positions. The lock assembly 24 is also constructed such that the key 32 is securely and fixedly retained within the slot when the lock cylinder 28 has been rotated to the on position. This prevents the key 32 from being removed from the lock assembly 24 unless it has been rotated to the off position.

As illustrated in FIG. 2, a flat plate member 34 is secured to the bottom surface of the tongue 30 of the lock assembly 24 so as to be rotatable therewith. The electrical switch means 14 is then mounted on the plate 34 such that rotation of the lock cylinder 28 correspondingly causes rotation of the electrical switch means 14 between first and second positions.

Although the actuating means for rotating the electrical switch 14 has been illustrated and described as comprising a key operated lock assembly, it will be understood that other forms of actuating means for rotating the electrical switch may also be utilized to practice the teachings of this invention. Thus, the actuating means may comprise a magnetically coded card which is inserted into a slot formed within the enclosure 12, with the magnetically coded information causing, through suitable circuitry, an actuation of the electrical switch means.

As shown in FIGS. 1 and 2, a convention light 36 is mounted on the top surface of the enclosure 12. The light 36 is connected, as described hereafter, so as to be illuminated when the electrical switch 14 has been rotated to the on position thereby providing an indication of the connection of an electrical device to the source of electrical energy.

As illustrated in FIG. 1, an electrical powered device or appliance 40 is adapted to be plugged into the control enclosure 12 by means of a conventionally formed plug 42 and a mating receptacle, not shown, which is mounted in the control enclosure 12. The electrical appliance 40 may include any suitable electrical powered device, such as a television, radio or conventional room lights. In addition, a plug 44 connected to the end of a conductor 46 extends outward from the control enclosure 12 and is adapted to be inserted into a conventional wall outlet so as to provide 120 VAC power to the control apparatus 10 for operating the electrical appliance 40.

Figure 3:
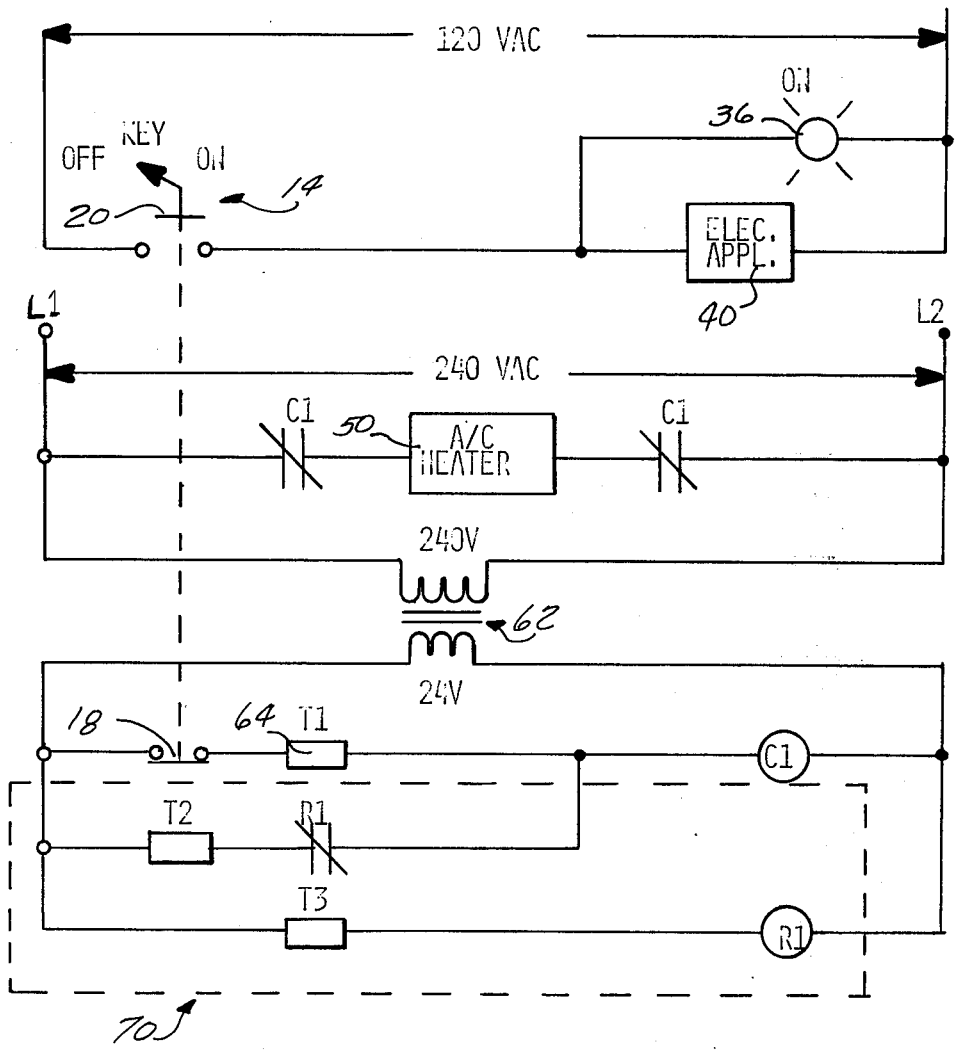
FIG. 3 is a schematic view of the electrical circuitry connecting the various components of the energy-temperature occupant monitor apparatus.

Referring now to FIG. 3, there is illustrated a schematic view of the electrical circuitry connecting the various components of the monitor apparatus 10 of this invention. As illustrated in a portion of the circuitry in FIG. 3, the second pole 20 of the electrical switch means 14 is connected in series between the source of electrical energy and the electrical appliance 40. As described above, the second pole 20 is closed when the actuating means is rotated to the on position. In this manner, electrical power is provided to the electrical appliance 40 as well as to the pilot light 36 which is connected in parallel therewith to provide an indication of a power on condition. In this manner, the electrical appliance 40 can be turned on only after the key 32 has been inserted into the slot in the lock assembly 24 and rotated to the on position. Conversely, rotation of the key 32 to the off position and its removal from the slot in the lock 24 will insure that the electrical appliance 40 is disconnected from the source of electrical energy.

As shown in FIG. 1, the monitor apparatus 10 is also adapted for controlling the connection and disconnection of a conventional heating or heating/air conditioning unit, shown symbolically at reference number 50, to a suitable source of electrical power. Since the monitor apparatus 10 of this invention is ideally suited for use in motel and hotel rooms which have their own individual heating and cooling controls, the following discussion will relate to the control of such heating and cooling apparatus. However, it will be understood that the monitor apparatus 10 of this invention may also be utilized to control other types of heating and cooling apparatus.

The means for controlling the heating and cooling apparatus 50 includes a remote receptacle 52 which is connected by wires or conductors 53 to the control enclosure 12. The remote enclosure 52 is in the form of a rectangular housing which has a conventional receptacle 54 mounted in one end thereof. The receptacle 54 is adapted to receive a matingly formed plug 56 which is connected to the heating and cooling apparatus 50. A conventional conductor 58 which terminates in another plug 60 extends outward from the remote enclosure 52 and is adapted to be removably received in a conventional wall outlet so as to provide power for the heating and air conditioning apparatus 50. It is also contemplated that the remote enclosure 52 may be hard wired directly into the building wiring instead of using the removable plug 60 and conductor 58. Furthermore, the wiring used to provide power to the heating and cooling apparatus 50 may be adapted for 240 VAC operation or 120 VAC operation depending upon the type of heating and cooling apparatus utilized.

The remote enclosure 52 has mounted therein, as shown in schematic form in FIG. 3, a contactor C1 and a transformer 62. The transformer 62 is utilized to convert the conventional 240 VAC power input to the remote enclosure 52 to 24 V low voltage power. This provides safer operation of the monitor apparatus 10 and enables components to be utilized which have lower power ratings. The contactor C1 includes a pair of normally closed contacts labeled C1 which are connected on opposed sides of the heater-cooling unit 50 between the input power lines L1 and L2 which are contained within the conductor 58 shown in FIG. 1. When the contactor C1 is de-energized, its contacts C1 are closed which thereby connects the heater-cooling unit 50 to the source of electrical energy and permits its operation by the occupant of the room. Conversely, whenever contactor C1 is energized, its contacts will be closed thereby disconnecting the heater-cooling unit 50 from the source of electrical energy.

The use of the normally closed contacts C1 provides a fail-safe operation such that should a failure occur in the circuitry of the monitor apparatus 10, contactor C1 will be de-energized which permits the heater-cooling unit 50 to remain in operation.

The contactor C1 controls the connection and disconnection of heating and cooling unit 50 to the source of electrical energy. Contactor C1 will connect the heater and cooling unit 50 to the source of electrical energy whenever it is de-energized. Thus, the control of the energization of the contactor C1 may simply be provided through the first pole 18 of the electrical switch means 14 which, as shown in FIG. 3, is connected to the coil of the contactor C1 and is closed when the switch means 14 is in the off or first position. In this state, the contactor C1 is energized which opens its contacts C1 thereby disconnecting the heater and cooling unit 50 from the source of electrical energy. When the key 32 is rotated to the on position the first switch 18 opens thereby de-energizing the contactor C1 and connecting the heater and cooling unit 50 to the source of electrical energy to permit its operation.

According to the preferred embodiment of this invention, means are provided for automatically maintaining the temperature of the room above a predetermined minimum temperature. The temperature maintaining means includes a temperature responsive member 64 shown in FIG. 2 and in schematic form in FIG. 3 in which it is labeled T1. The temperature responsive means 64 is mounted in the control enclosure 12 with its sensing surface 66 exposed to the ambient environment of the room. According to the preferred embodiment of this invention, the temperature responsive means 64 comprises a thermistor which acts as a closed switch above a predetermined selected temperature. Thus, a thermistor selected for 60° F. will close whenever the ambient temperature reaches 60°. As shown in the circuitry depicted in FIG. 3, the thermistor 64 (T1) is connected in series with the first switch 18 of the electrical switch means 14 to energize the coil of the contactor C1. Thus, when the electrical switch means 14 is in the first or off position, the thermistor 64 (T1) will act as a closed switch thereby energizing the contactor C1 whenever the temperature of the surrounding room is above 60° F. This will disconnect the heater 50 from the source of electrical energy. If the temperature of the surrounding room is below 60° F., the contactor C1 will be de-energized and, accordingly, the heater 59 will be connected to the source of electrical energy thereby permitting its operation to raise the temperature of the room to the preset minimum temperature. Of course, thermistors having different temperatures at which they are switched to a closed state may be provided in order to maintain the temperature of the room at any desired minimum temperature level.

When the electrical switch means 14 is moved to the second or on position, the first switch 18 will be open thereby de-energizing the contactor C1 which, in turn, connects the heater and cooling unit 50 to the source of electrical energy.

An important feature of this invention is the provision of suitable means that insures that the heating and cooling unit 50 as well as the electrical appliance 40 is disconnected from the source of electrical power whenever the occupant of the room or predetermined area in which the electrical devices are located leaves the area. In order to insure the automatic disconnection of the electrical devices, the key 32 is securely affixed to the means for permitting ingress to the room or predetermined area. The ingress means comprises a conventional room key 66, as shown in FIG. 1. The room key 66 is typically connected to one end of a key holder 68. The key 32 is then securely connected at the opposite end of the key holder 68 to ensure that the key 32, when inserted in the enclosure 12, must be moved to the off position before it can be removed from the control enclosure 12 in order to permit the occupant of the room to take the room key 66 with him when he leaves. This ensures that the electrical devices within the room are disconnected when the occupant leaves the room.

According to another embodiment of this invention, the monitor apparatus 10 includes means for maintaining the temperature of the room within predetermined limits. This means, denoted in general by reference number 70 in FIG. 3, includes second and third temperature responsive devices, labeled T2 and T3, respectively. The temperature responsive devices T2 and T3 may be thermistors, each selected to switch to a closed state at different room temperatures. Thus, thermistor T2 may be selected to close at a first or lower temperature, such as 72° F.; while the third thermistor T3 will close when the room temperature reaches a higher temperature, such as 75° F. The third thermistor T3 is connected in series with the coil of a relay R1 which is mounted within the remote enclosure 52. In this manner, when the temperature of the room exceeds 75° F., thermistor T3 will be closed thereby energizing the relay R1. A normally closed contact of the relay R1 is connected in series with the second thermistor T2 and the coil of the contactor C1. Thus, when the relay R1 is energized, its contact opens thereby de-energizing the contactor C1 and connecting the cooling unit 50 to the source of electrical energy. In this manner, the cooling unit 50 will operate to lower the temperature of the room below 75° F.

If the temperature of the room is above 72° F. but below 75° F., thermistor T2 will be closed which will energize contactor C1 and thereby disconnect the heater unit 50 from the source of electrical energy. When the room temperature falls below 72° F., thermistor T2 will be in the open state which, through contactor C1, will cause the heater unit 50 to be connected to the source of electrical energy thereby raising the temperature of the room above 72° F. In this manner, the second and third thermistors T2 and T3 function to maintain the temperature of the room between the preset limits. This enables the temperature of the room to be maintained within the current Federal energy conservation guidelines despite any efforts of the occupant to raise or lower the temperature outside of the preset range.

There has been disclosed herein a new and improved energy-temperature occupant monitor apparatus which selectively connects and disconnects electrical power devices from a source of electrical energy. The monitor apparatus includes an activation means which is secured to and carried by the means for allowing ingress to a predetermined area or room, such as a conventional room key. An electrical switch means, responsive to the actuating means, is switchable between a first off position and a second on position. When in the second on position, the activation means is securely affixed to the electrical switch means thereby preventing its removal unless the activation means and the switch means are moved to the off position. This ensures that the power to the electrical devices within the room or predetermined area is disconnected when the occupant leaves the room.

In addition, means are also provided for maintaining the temperature of the room above a predetermined minimum to provide a comfortable temperature level at all times. Furthermore, additional temperature responsive devices are incorporated in the shut off apparatus to automatically maintain the temperature of the room within preset temperature range despite any efforts of the occupant to raise or lower the temperature outside of the range. The monitor apparatus provides significant energy savings since the electrical devices which are commonly left on when the occupant leaves the room are disconnected from the source of electrical energy whenever the occupant leaves the room thereby preventing their unnecessary and wasteful operation when the room or predetermined area is empty.

What is claimed is:

1. Apparatus selectively connecting an electrically powered device and a heating and cooling means located within a predetermined area having means for controlling access thereto to a source of electrical energy comprising:
    an electrical switch means disposed within said predetermined area and switchable between first and second positions and connectable between said electrically powered device and said heating and cooling means and said source of electrical energy for selectively connecting and disconnecting said electrically powered device and said heating and cooling means to said source of electrical energy;
    actuating means for switching said electrical switch means between a first position disconnecting said electrically powered device from said source of electrical energy and a second position connecting said electrically powered device to said source of electrical energy;
    said actuating means being lockably engaged with said electrical switch means when said electrical switch means is in said second position thereby preventing the disengagement of said actuating means from said electrical switch means;
    said actuating means secured to and carried by said access controlling means such that said electrical switch means must be switched to the first position in which said electrically powered device is disconnected from said source of electrical energy before said access controlling means can be removed from said predetermined area;
    means for automatically maintaining the temperature of said predetermined area above a predetermined minimum temperature when said electrical switch means is disposed in the first position, said temperature maintaining means including a temperature responsive element connected so as to energize said heating and cooling means when the temperature of said predetermined area is below the predetermined minimum temperature; and
    means, responsive to the temperature of said predetermined area, for automatically maintaining the temperature of said predetermined area within a predetermined temperature range when said electrical switch means is in said second position, said temperature responsive means including first and second temperature sensing means adapted to switch to a closed state at a preset first lower temperature and a preset second higher temperature, respectively, said first and second temperatures defining the predetermined temperature range, said first and second temperature sensing means being connected so as to disconnect said heating and cooling means from the source of electrical energy when the temperature of said predetermined area is outside of the predetermined temperature range.

2. The apparatus of claim 1 wherein the predetermined area includes an entrance having a lock and wherein the access controlling means comprises a first key which, in conjunction with said lock, is adapted to lock and unlock the predetermined area in which the electrically powered device is located.

3. The apparatus of claim 1 wherein the actuating means comprises;
    a key; and
    a key operated lock including a rotatable lock cylinder;
    the electrical switch means being carried by and rotatable with said lock cylinder.

4. The apparatus of claim 1 wherein the temperature responsive element is a thermistor adapted to switch to a closed state at a predetermined temperature.

5. The apparatus of claim 1 wherein the first and second temperature sensing means comprise first and second thermistors, respectively.

6. An apparatus selectively connecting an individually operated electrically powered device and an electrically operated heating and cooling means located in one room of a multi-room building, utilizing a pass key to provide access to said room, to a source of electrical energy, said apparatus comprising:

an enclosure adapted to be disposed in said room;
a key operated lock mounted in said enclosure and having a lock cylinder rotatable between first and second positions;
a first key adapted to engage said lock and rotate said lock cylinder;
said lock securely retaining said first key in said lock when said lock is in said second position;
electrical switch means mounted to said lock cylinder and rotatable between first and second on positions;
said first key being secured to and carried by said pass key such that said lock must be rotated to the first position before said first key and said pass key can be removed from said lock and said room;
said electrical switch means including first and second electrical switches, each carried by said lock cylinder and switchable between on and off states;
said first electrical switch being connected between said source of electrical energy and said electrically powered device so as to connect said electrically powered device to said source of electrical energy when said first key is rotated to said second position;
said second electrical switch being connected between said source of electrical energy and said heating and cooling means so as to connect said heating and cooling means to said source of electrical energy when said first key is rotated to said second position;
a temperature responsive device mounted in said enclosure and adapted to switch to a closed state when the temperature of said room reaches a predetermined minimum temperature;
said temperature responsive device being electrically connected to said heating and cooling means so as to connect said heating and cooling means to said source of electrical energy when the temperature of said room is below said minimum temperature in order to maintain the temperature of said room above said minimum temperature; and
means, responsive to the temperature of said room for automatically maintaining the temperature of said room within a predetermined temperature range when said first key is in said second position, said temperature responsive means including second and third temperature sensing devices switchable to a closed state at a preset first lower temperature and a preset second higher temperature, respectively, to define the predetermined temperature range, said second and third temperature sensing devices being electrically connected to said heating and cooling means so as to disconnect said heating and cooling means from said source of electrical energy when the temperature of said room is outside of said predetermined temperature range and thereby maintain the temperature of said room within said predetermined temperature range.

* * * * *